(12) United States Patent
Ovadia et al.

(10) Patent No.: US 8,656,368 B1
(45) Date of Patent: Feb. 18, 2014

(54) SYSTEM, METHOD, AND COMPUTER PROGRAM PRODUCT FOR ABSTRACT SOFTWARE PERFORMANCE PROFILING

(75) Inventors: Meir Ovadia, Rosh Haa-ayin (IL); Efrat Gavish, Rosh Haa-ayin (IL)

(73) Assignee: Cadence Design Systems, Inc., San Jose, CA (US)

(*) Notice: Subject to any disclaimer, the term of this patent is extended or adjusted under 35 U.S.C. 154(b) by 253 days.

(21) Appl. No.: 13/179,949

(22) Filed: Jul. 11, 2011

(51) Int. Cl.
*G06F 9/44* (2006.01)
*G06F 11/00* (2006.01)

(52) U.S. Cl.
USPC .................... 717/130; 717/124; 714/38.1

(58) Field of Classification Search
USPC ............... 717/124–135; 714/37, 38.1
See application file for complete search history.

(56) References Cited

U.S. PATENT DOCUMENTS

| | | | | |
|---|---|---|---|---|
| 5,542,070 A * | 7/1996 | LeBlanc et al. | | 703/20 |
| 6,028,999 A * | 2/2000 | Pazel | | 717/134 |
| 6,826,748 B1 * | 11/2004 | Hohensee et al. | | 717/130 |
| 6,941,545 B1 * | 9/2005 | Reese et al. | | 717/130 |
| 7,013,456 B1 * | 3/2006 | Van Dyke et al. | | 717/130 |
| 8,079,023 B2 * | 12/2011 | Chen | | 717/140 |
| 8,141,053 B2 * | 3/2012 | Levine | | 717/127 |
| 8,359,437 B2 * | 1/2013 | Karstens | | 711/147 |
| 2003/0066055 A1 * | 4/2003 | Spivey | | 717/131 |
| 2008/0235675 A1 * | 9/2008 | Chen | | 717/147 |
| 2009/0178036 A1 * | 7/2009 | Levine | | 718/1 |
| 2009/0287886 A1 * | 11/2009 | Karstens | | 711/147 |

OTHER PUBLICATIONS

"Verification Intellectual Property (VIP) Recommended Practices, Version 1.0," Aug. 25, 2009, Accellera, p. 1-90.*

* cited by examiner

*Primary Examiner* — Qing Chen
(74) *Attorney, Agent, or Firm* — Holland & Knight LLP; Mark H. Whittenberger, Esq.

(57) ABSTRACT

The present disclosure relates to a computer-implemented method for abstract software performance profiling. The method may include providing, using a computing device, a virtual run-time stack associated with a software performance profile. The method may further include generating, using the computing device, at least one abstract tag associated with the virtual run-time stack. The method may also include performing, using the computing device, at least one operation on the virtual run-time stack, the at least one operation including, at least in part, the at least one abstract tag.

18 Claims, 2 Drawing Sheets

SYSTEM, METHOD, AND COMPUTER PROGRAM PRODUCT FOR ABSTRACT SOFTWARE PERFORMANCE PROFILING

FIELD OF THE INVENTION

The present disclosure relates to software performance profiling, and more specifically, to abstract software performance profiling.

DISCUSSION OF THE RELATED ART

The electronic design automation (EDA) industry, by its nature, from the early ages, should handle huge amount of elements, described by a huge amount of data. As a result, algorithms and runs may take hours in the best cases, and typically days. A one percent improvement might reduce the size of a server farm by a few servers, or reduce run-time by an hour or more. Such an environment dictates that a great deal of attention is allocated to achieve high-performance software—first, within the EDA software tools themselves, and second—within the EDA environments, whether it is a design itself, its verification environment, etc.

One method that is used to improve the performance of a given software tool or environment is through the use of software performance profiling. Performance profilers enable focused and detailed analysis of software run-time and memory consumption, and by that—may allow for the quick resolution of performance issues, reduced run-time, and overall better productivity. In reality, performance profilers are key players in the EDA world, and are in use both to improve EDA tools and the user's environments built on top of them. For example, performance improvements of a test-bench regression imply running of more tests and iterations in a shorter run-time. Therefore EDA users may use performance profilers to optimize their regressions, and eventually will get higher quality in a shorter time. Unfortunately, using the current (traditional) profilers, it may take hours to analyze results. This may be due to a variety of reasons, including the complexity of the profilers, the complexity of the software-under-investigation, the person that analyzes the results may be unfamiliar with the software-under-investigation, etc.

Existing performance profilers, such as the statistical profiler, are based on samples in specified time intervals where the information is taken from the program's run-time stack using interrupts. The analysis is done based on the collected raw stack information. However, the granularity is fixed in advance, by the tool on one hand, and the source programming language on the other hand. The run-time information within the run-time stack is derived from the above two factors. Moreover, the traditional profiler provides data only on entities that are time-continuous, e.g., something that starts at certain point of time and ends X milliseconds later. Further, the traditional approach may only handle hierarchical nested sequences, due to the implementation of programming languages and the corresponding profilers.

SUMMARY OF INVENTION

In one or more embodiments of the present disclosure, a computer-implemented method for abstract software performance profiling is provided. In some embodiments the method may include providing, using a computing device, a virtual run-time stack associated with a software performance profile. The method may further include generating, using the computing device, at least one abstract tag associated with the virtual run-time stack. The method may also include performing, using the computing device, at least one operation on the virtual run-time stack, the at least one operation including, at least in part, the at least one abstract tag.

One or more of the following features may be included. In some embodiments, the at least one operation includes one or more of a push operation, a pop operation, and a stack operation. The method may further include determining if a top of stack is different than an expected tag. The method may also include issuing at least one error message in response to the determination. The method may additionally include iteratively popping the virtual run-time stack until the expected tag is located. The at least one abstract tag may be associated with one or more of a verification intellectual property (VIP) data, bus functional model (BFM) data, and block-level data. The method may further include mapping at least one portion of code to one or more categories.

In one or more embodiments of the present disclosure, a system for abstract software performance profiling is provided. In some embodiments, the system may include a computing device having at least one processor configured to provide a virtual run-time stack associated with a software performance profile, the at least one processor further configured to generate at least one abstract tag associated with the virtual run-time stack, the at least one processor further configured to perform at least one operation on the virtual run-time stack, the at least one operation including, at least in part, the at least one abstract tag.

One or more of the following features may be included. In some embodiments, the at least one operation includes one or more of a push operation, a pop operation, and a stack operation. The system may be further configured to determine if a top of stack is different than an expected tag. The system may be further configured to issue at least one error message in response to the determination. The system may be further configured to iteratively pop the virtual run-time stack until the expected tag is located. The at least one abstract tag may be associated with one or more of a verification intellectual property (VIP) data, bus functional model (BFM) data, and block-level data. The system may be further configured to map at least one portion of code to one or more categories.

In one or more embodiments of the present disclosure, a computer-readable storage medium for abstract software performance profiling is provided. The computer-readable storage medium may have stored thereon instructions that when executed by a machine result in a number of operations. Some operations may include providing, using a computing device, a virtual run-time stack associated with a software performance profile. Operations may further include generating, using the computing device, at least one abstract tag associated with the virtual run-time stack. Operations may also include performing, using the computing device, at least one operation on the virtual run-time stack, the at least one operation including, at least in part, the at least one abstract tag.

One or more of the following features may be included. In some embodiments, the at least one operation includes one or more of a push operation, a pop operation, and a stack operation. Operations may further include determining if a top of stack is different than an expected tag. Operations may also include issuing at least one error message in response to the determination. Operations may additionally include iteratively popping the virtual run-time stack until the expected tag is located. The at least one abstract tag may be associated with one or more of a verification intellectual property (VIP) data, bus functional model (BFM) data, and block-level data. Operations may further include mapping at least one portion of code to one or more categories.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
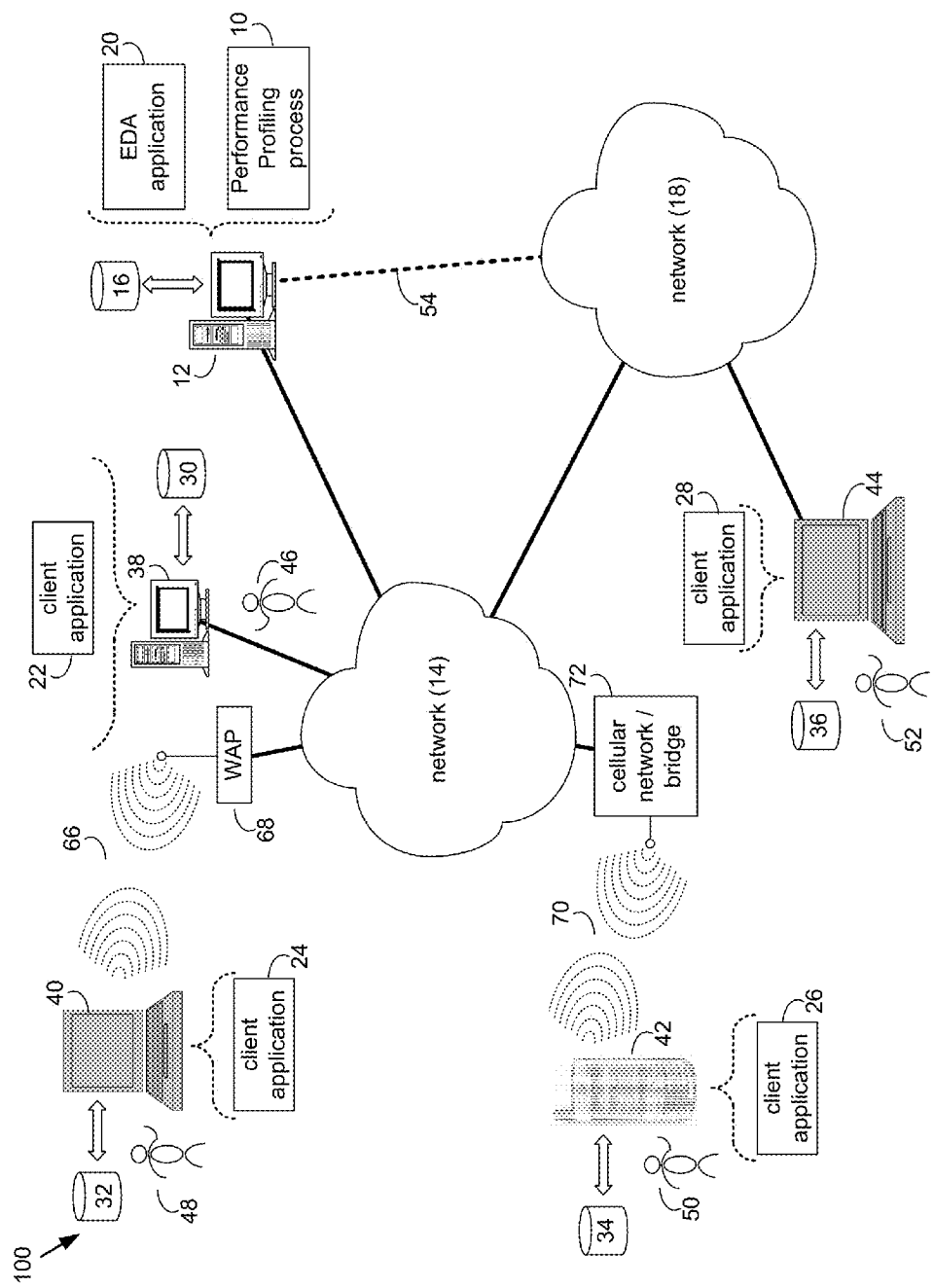
FIG. 1 is a system diagram depicting aspects of the performance profiling process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown performance profiling process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the performance profiling process may reside on and be executed, in whole or in part, by a client electronic device, such as a personal computer, notebook computer, personal digital assistant, or the like.

As will be discussed below in greater detail, performance profiling process 10 may include a method for abstract software performance profiling. The method may include providing, using a computing device, a virtual run-time stack associated with a software performance profile. The method may also include generating, using the computing device, at least one abstract tag associated with the virtual run-time stack. The method may additionally include performing, using the computing device, at least one operation on the virtual run-time stack, the at least one operation including, at least in part, the at least one abstract tag.

The instruction sets and subroutines of performance profiling process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for abstract performance profiling. EDA application 20 may be referred to herein as a design tool.

Performance profiling process 10 may be a stand alone application, or may be an applet/application/script that may interact with and/or be executed within EDA application 20. In addition/as an alternative to being a server-side process, the performance profiling process may be a client-side process (not shown) that may reside on a client electronic device (described below) and may interact with an EDA client application (e.g., one or more of EDA client applications 22, 24, 26, 28). Further, the performance profiling process may be a hybrid server-side/client-side process that may interact with EDA application 20 and an EDA client application (e.g., one or more of client applications 22, 24, 26, 28). As such, the performance profiling process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize performance profiling process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

In some embodiments, the present disclosure is directed towards a system and method for abstract performance profiling. In some embodiments, the present disclosure provides an abstraction to the statistical profilers.

In some embodiments, performance profiling process 10 may enable package-writers to organize and present the performance data in a high level way, regardless of the hierarchical execution of the analyzed program. This may be achieved by using categories, defined statically by the package-writer. These categories may represent, for example, logical functionality units. In some embodiments, there may be several levels of users.

In operation, a package-writer may first define categories, using his/her best discretion. Then using an application programming interface ("API") the code may be mapped to these categories. In some embodiments, during run-time performance profiling process 10 may be notified for every starting and ending of a category. In this way, performance profiling process 10 may record that run-time information and eventually present the results in the resolution of the categories. In some embodiments, the results may be displayed to an application-developer, who may write an application on-top of the above package. Thus, using the API, the package-writer may prepare an advanced infrastructure for performance analysis for one level above, e.g., for the application-developer. Performance profiling process 10 may allow for mapping of not only procedural code pieces to categories, but also declarative code, such as struct members and by that performance profiling process 10 may enable analysis of more sophisticated cross-cuts of systems. In some embodiments, the API user may be the package-writer, and the users of performance profiling process 10 may be application-developers, who may write an application on-top of such a package.

In some embodiments, for example, there may be several packages, one on-top of the other, and a user may function as an application-developer with respect to levels "below", and as a package-writer with respect to the levels "above". Package-writers may encapsulate concepts in their package using that API, and by that enable performance profiling process 10 to show the information in abstract level (preferably in user terms). The application developer needs to do nothing, but use the profiler and see the processed data. In general, a package writer (at any level) may add a level of abstraction to performance profiling process 10 using the API, and that information may be accessible to the application-developer above. The package-writer may also decide to block some or all of the abstract information created by packages "below' it. By default performance profiling process 10 may allow for a zoom-in all the way down to the block-level information. Additionally and/or alternatively, performance profiling process 10 may get into line-level information as well. During analysis, an application-developer may be exposed to any encapsulation done in any package used by his application, and may be able to zoom-in into lower levels, provided that they have not been blocked by some package-writer "below".

In some embodiments, the abstract nature of the performance profiling process 10 described herein may provide numerous capabilities not provided by traditional profilers. For example, the user of performance profiling process 10 may define the granularity of the process, while in the traditional profiler the granularity is fixed in advanced, by the tool and also by the source programming language. The term "granularity" as used herein may refer to the nature of the item to be monitored. For example, in one extreme it could be one programming language statement, while on the other extreme it could be a set of method calls. Further, the traditional profiler is limited to provide data only on entities that are time-continuous, something that starts at one particular time and ends X milliseconds later. In contrast, performance profiling process 10, by its nature, may provide aggregate data. For example, assume that the handling of some object is performed in run-time using three different separated time intervals. If these intervals are marked by the same tag, then there may be one datum received for this tag, which reflects the aggregation of these intervals. Moreover, traditional profilers may handle only hierarchical nested sequences, due to the implementation of programming languages and the corresponding profilers. Therefore, traditional profilers can handle (i.e. aggregate data and report) two sequences A and B, either in case they are disjoint, or one is encapsulated within the other. In contrast, performance profiling process 10, may handle anything a traditional profiler can, but in addition, it may handle properly a case when Sequence-A starts, then Sequence-B, then Sequence-A ends then Sequence-B ends. As a result, the expressiveness power of performance profiling process 10 may be stronger than that of traditional profilers. Further, due to the limitation of traditional profilers regarding nesting (see above), it is the user's responsibility to assure that marking the end of any sequence will be done at the correct place, i.e., without violation of the nesting principle. That requires from the user a deep and wide understanding of all possible application's run-time sequences. On the other hand, performance profiling process 10, allows for crossing sequences (see above), which implies that marking end-of-sequence is legitimate at any point. In other words, that level of user knowledge is not required. Therefore, performance profiling process 10 may be significantly easier to use and also less error-prone than traditional profilers. Further, the run-time information in performance profiling process 10 may be presented to the user by the logical/abstract terms, as were defined earlier by the user (on top of the implementation level). Consequently, performance profiling process 10 may allow for the quick identification and resolution of various performance problems.

In some embodiments, performance profiling process 10 provides the capability to create abstract tags and to push/pop them to/from the same virtual run-time stack. Performance profiling process 10 provides a change from the implementation-based performance analysis of traditional profilers to an abstract performance analysis.

One exemplary embodiment depicting aspects of performance profiling process 10 is provided below. In this particular example, assume three different functions called A, B and C. Assume that in each of them there is a section handling printing of some data, and assume we are interested in the performance of the whole printing aspect. In a traditional profiler (TP), the basic granularity is predefined (i.e. a whole function or a single action), while in this example we are interested in the accumulated number of three different fractions of different functions. Using push( ) and pop( ) of the same tag, at the beginning and end of each of the three separate sections may immediately provide the integrated performance number of the whole printing aspect. In order to maintain and enforce consistent stack, push(tag) and pop(tag) operations for a specific aspect must use the same tag. When executing pop(tag), the tag should be checked, and should be found to be identical to the tag at the top of the stack. If the top of the stack is different than the tag expected by the pop(tag), then it can be decided to either issue an error, or to pop the stack iteratively till the expected tag is pop( ) The later scenario is expected to provide smooth operation of the profiler in most cases, and to cause minor distortion of the results. Note that when the profiler is off there is no performance penalty.

Another exemplary embodiment, depicting three levels of tags, is provided below. In this particular example a bus functional model ("BFM") writer, a verification intellectual property ("VIP") writer and a block level code implementation are shown.

```
API
profiler.push(string)
profiler.pop(string)
profiler.push_blocking_lower_level(string)
//This is just one of the optional APIs and we can also think about API that gets an object as parameter.
    BFM/Monitor Writer
Struct Monitor {
   Monitor API1( ) is {
   profiler.push("Monitor");
   M1( );
   profiler.pop("Monitor");
   };
   M1( ) is { . . . , M2( ); , . . . };
   M2( ) is { . . . }
   Monitor_API2( ) is {
   profiler.push ("Monitor");
   C1( );
   profiler.pop("Monitor");
   };
   C1( ) is { . . . , C2( ); , . . . };
   C2( ) is { . . . }
};
Struct BFM {
BFM_API1( ) is }
      profiler.push_blocking_lower_level("BFM");
      F1( );
      profiler.pop("BFM");
   };
   F1( ) is { . . . , F2( ), . . . };
   F2( ) is { . . . }
   BFM_API2( ) is {
      profiler.push_blocking_lower_level ("BFM");
      G1( );
      profiler.pop("BFM");
   };
      G1( ) is { . . . , G2( ); , . . . };
      G2( ) is { . . . }
};
   VIP Writer
Class VIP1 {
   VIP_API1( ) is {
   profiler.push("MY_VIP1");
   . . .
   BFM.BFM_API1( );
   . . .
   Monitor.Monitor_API1( );
   . . .
   BFM.BFM_API2( );
   . . .
   Monitor.Monitor_API2( );
   . . .
   PROFILER.pop("MY_VIP1")
   };
   VIP_API2( ) is {same as VIP_API1 [same tag]};
   }
Class VIP2{
   Same as class VIP1 but with MY_VIP2 tag;
};
   Integrator
Class my_main {
   Main( ) {
   VIP1.VIP_API1( )
   VIP2.VIP_API1( );
   VIP1.VIP_API2( );
   . . .
   };
};
   Profiler Result
   Self 10%
   MY_VIP1 40%
   MY_VIP2 50%
While clicking MY_VIP1 getting
   Self 25%
   BFM 40%
   Monitor 45%
While clicking on Monitor getting
   M1( ): 10%
   M2( ): 19%
   . . .
   C1( ): 13%
   C2( ): 34%
```

As shown above, performance process 10 may generate the traditional block-level results in accordance with the selected methods. In some embodiments, BFM may not be clickable because it may block all the tags below it (e.g., using profiler.push_blocking_lower_level API).

Figure 2:
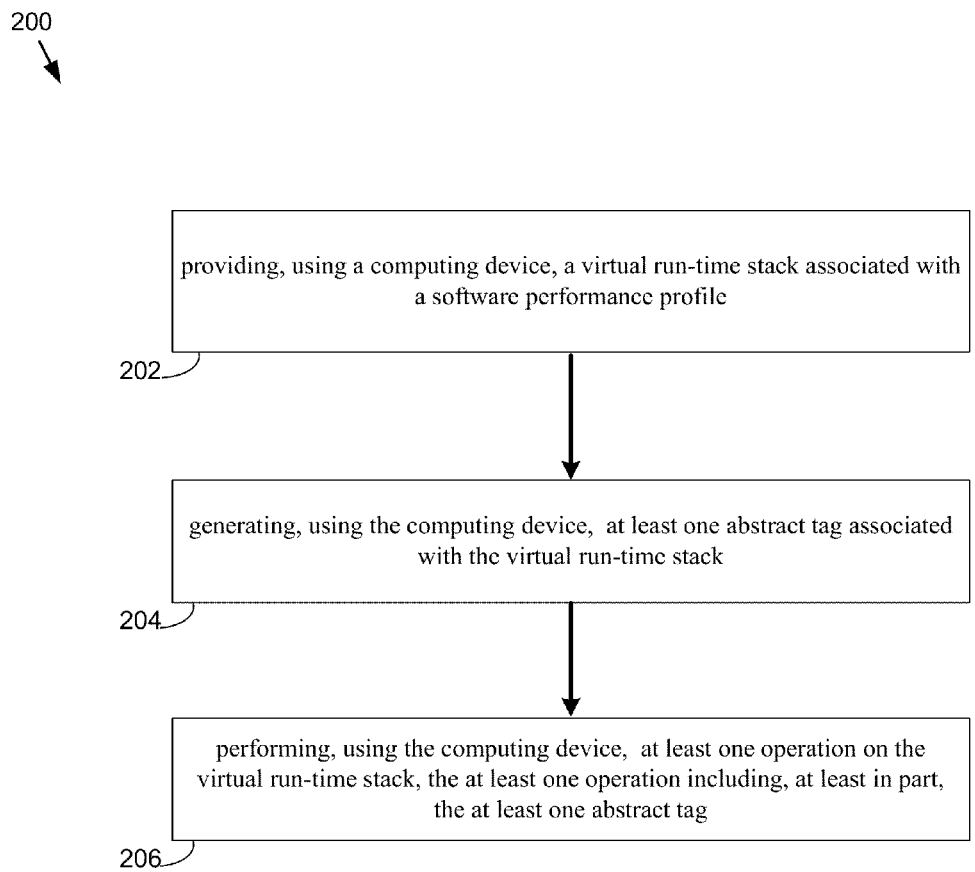
FIG. 2 is a flowchart depicting operations consistent with the performance profiling process of the present disclosure.

Referring now to FIG. 2, a flowchart 200 depicting operations consistent with an embodiment of the performance profiling process of the present disclosure is provided. Operations may include providing, using a computing device, a virtual run-time stack associated with a software performance profile (202). Operations may also include generating, using the computing device, at least one abstract tag associated with the virtual run-time stack (204). Operations may additionally include performing, using the computing device, at least one operation on the virtual run-time stack, the at least one operation including, at least in part, the at least one abstract tag (206).

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for abstract software performance profiling comprising:
   providing, using a computing device, a virtual run-time stack associated with a software performance profile;
   generating, using the computing device, at least one abstract tag associated with the virtual run-time stack, wherein the at least one abstract tag is associated with one or more of a verification intellectual property (VIP) data and a bus functional model (BFM) data; and
   performing, using the computing device, at least one operation on the virtual run-time stack, wherein the at least one operation includes, at least in part, the at least one abstract tag.

2. The computer-implemented method of claim 1, wherein the at least one operation includes one or more of a push operation, a pop operation, and a stack operation.

3. The computer-implemented method of claim 1, further comprising:
   determining if a top of the virtual run-time stack is different than an expected tag.

4. The computer-implemented method of claim 3, further comprising:
   issuing at least one error message in response to the determination.

5. The computer-implemented method of claim 3, further comprising:
   iteratively popping the virtual run-time stack until the expected tag is located.

6. The computer-implemented method of claim 1, further comprising:
   mapping at least one portion of code to one or more categories.

7. A system for abstract software performance profiling comprising:
   a computing device having at least one processor configured to provide a virtual run-time stack associated with a software performance profile, wherein the at least one processor is further configured to generate at least one abstract tag associated with the virtual run-time stack, wherein the at least one abstract tag is associated with one or more of a verification intellectual property (VIP) data and a bus functional model (BFM) data, wherein the at least one processor is further configured to perform at least one operation on the virtual run-time stack, and wherein the at least one operation includes, at least in part, the at least one abstract tag.

8. The system of claim 7, wherein the at least one operation includes one or more of a push operation, a pop operation, and a stack operation.

9. The system of claim 7, wherein the at least one processor is further configured to determine if a top of the virtual run-time stack is different than an expected tag.

10. The system of claim 9, wherein the at least one processor is further configured to issue at least one error message in response to the determination.

11. The system of claim 9, wherein the at least one processor is further configured to iteratively pop the virtual run-time stack until the expected tag is located.

12. The system of claim 7, wherein the at least one processor is further configured to map at least one portion of code to one or more categories.

13. A non-transitory computer-readable storage medium for abstract software performance profiling, the non-transitory computer-readable storage medium having stored thereon instructions that when executed by a machine result in the following operations:
   providing, using a computing device, a virtual run-time stack associated with a software performance profile;
   generating, using the computing device, at least one abstract tag associated with the virtual run-time stack, wherein the at least one abstract tag is associated with one or more of a verification intellectual property (VIP) data and a bus functional model (BFM) data; and
   performing, using the computing device, at least one operation on the virtual run-time stack, wherein the at least one operation includes, at least in part, the at least one abstract tag.

14. The non-transitory computer-readable storage medium of claim 13, wherein the at least one operation includes one or more of a push operation, a pop operation, and a stack operation.

15. The non-transitory computer-readable storage medium of claim 13, wherein operations further comprise:
   determining if a top of the virtual run-time stack is different than an expected tag.

16. The non-transitory computer-readable storage medium of claim 15, wherein operations further comprise:
   issuing at least one error message in response to the determination.

17. The non-transitory computer-readable storage medium of claim 15, wherein operations further comprise:
   iteratively popping the virtual run-time stack until the expected tag is located.

18. The non-transitory computer-readable storage medium of claim 13, wherein operations further comprise:
   mapping at least one portion of code to one or more categories.

* * * * *